| United States Patent [19] | [11] Patent Number: 4,898,922 |
|---|---|
| Shiraki | [45] Date of Patent: Feb. 6, 1990 |

[54] URETHANE RESINS

[75] Inventor: Hiroyuki Shiraki, Kobe, Japan

[73] Assignee: Takeda Chemical Industries, Ltd., Osaka, Japan

[21] Appl. No.: 253,863

[22] Filed: Oct. 5, 1988

[30] Foreign Application Priority Data

Oct. 12, 1987 [JP] Japan ................... 62-256886

[51] Int. Cl.$^4$ ............................. C08G 18/32
[52] U.S. Cl. ...................... 528/60; 528/65; 528/76; 528/77; 528/80; 528/83; 528/85
[58] Field of Search ............ 528/76, 77, 80, 83, 528/85, 60, 65

[56] References Cited

U.S. PATENT DOCUMENTS

| 3,114,734 | 12/1963 | Gobran | 528/52 |
|---|---|---|---|
| 3,446,780 | 5/1969 | Bertozzi | 528/55 |
| 4,152,485 | 5/1979 | Mizumura et al. | 428/425 |
| 4,225,695 | 9/1980 | Schuster et al. | 528/75 |
| 4,271,289 | 6/1981 | Homan et al. | 528/374 |
| 4,320,171 | 3/1982 | Motz et al. | 428/423.1 |
| 4,507,458 | 3/1985 | Shiraki et al. | 528/49 |
| 4,668,406 | 5/1987 | Chang | 252/8.75 |
| 4,680,369 | 7/1987 | Kajimoto et al. | 528/76 |
| 4,689,387 | 8/1987 | Kajimoto et al. | 528/76 |
| 4,742,125 | 5/1988 | Schmidt et al. | 525/333.2 |

FOREIGN PATENT DOCUMENTS 62-88134  7/1987  Japan .

Primary Examiner—Maurice J. Welsh
Assistant Examiner—L. Henderson
Attorney, Agent, or Firm—Wenderoth, Lind & Ponack

[57] ABSTRACT

Urethane resin having hydrophilic polar groups (mercapto groups) shows excellent dispersibility of magnetic powder when used as a binder for magnetic recording media. Magnetic recording media prepared by using the binder are excellent in surface-smoothness and durability. The mercapto groups contained in the magnetic layer react with isocyanate groups in the polyisocyanate to form thiourethane bonds to leave no hydrophilic polar groups, i.e., mercapto groups, and thus is excellent in moisture- and heat-resistance as well.

The resin and the binding agent are advantageously used in the production of magnetic recording media, for example, magnetic tape, magnetic disc, etc.

5 Claims, No Drawings

URETHANE RESINS

The present invention relates to a resin usable in the production of magnetic recording media such as magnetic tapes, magnetic discs, etc., a binder comprising the resin and a magnetic recording medium prepared by using the binder. As binders for magnetic recording media, there have so far been used e.g. polyurethane resin, polyester resin, nitro cellulose, vinyl chloride-vinyl acetate copolymer, or vinyl chloride-vinyl acetate-vinyl alchol copolymer in combination with a curing agent such as polyisocyanate, etc. On the other hand, with an improvement recently accomplished on properties of magnetic recording media, utilization of ultrafine magnetic powder with high-coercivity has been suggested, but the above-mentioned binders have been found to be insufficient for imparting satisfactory dispersion, surface-smoothness and durability. For realizing the use of ultrafine magnetic powder, the use of polyester resin containing an alkali metal salt of sulfonic acid (Publication of Unexamined patent application No. Sho 57-3134), and polyurethane resin containing an alkali metal salt of sulfonic acid (Publication of Examined patent application No. Sho 58-41565) as a component of the binder has been proposed.

A binder containing an alkali metal salt of sulfonic acid, mentioned as above, is improved in dispersibility due to its hydrophilic polar groups, as compared with that having non polar groups, but the improvement is not sufficient, because the existence of the hydrophilic polar group exerts undesirable effects on the moisture- and heat-resistant properties. Thus, achieving a magnetic recording medium having satisfactory heat- and moisture-resistant properties has been impossible.

The present invention is to improve the above-mentioned drawbacks, and its object is to provide urethane resins giving excellent surface-smoothness, durability and moisture- and heat-resistance to a magnetic layer, as well as binders containing them.

The present inventors conducted intensive research, and as a result, found that a urethane resin having mercapto groups disperses well even micro-granulated magnetic powder. Polyisocyanate used as the curing agent reacts with mercapto groups in the urethane resin to cause thiourethane linkage by curing and the resulting binding agent contains no polar groups. Thus the urethane resin exhibits good moisture-and heat-resistant properties.

More specifically, the present invention relates to:

1. a urethane resin having mercapto groups in a ratio of about 0.01 to 1 milli-equivalent/g;

2. a binder for magnetic recording medium comprising a urethane resin having mercapto groups in a ratio of about 0.01 to 1 milli-equivalent/g and polyisocyanate; and 3. a magnetic recording medium having a magnetic layer bound with a binder for magnetic recording medium, the binder being comprised of a urethane resin having mercapto groups in a ratio of about 0.01 to 1 milli-equivalent/g and polyisocyanate.

The urethane resin having mercapto groups, which is employed in the present invention, is obtained by the reaction between a polyhydroxy compound and polyisocyanate. More concretely, by substituting a polyhydroxy compound having mercapto groups partially or totally for a polyhydroxy compound, the mercapto groups are introduced into the urethane resin. The mercapto groups thus introduced are present in the urethane resin as terminal groups. Examples of the polyhydroxy compound having mercapto groups include 3-mercapto-1,2-propanediol. Additionally, mercapto containing compounds having only one hydroxyl group, such as 2-mercapto ethanol, 2,3-dimercapto-1-propanol, etc. can be used. As the polyhydroxy compound having no mercapto groups, the use of long chain diols whose molecular weight ranges from about 500 to 3,000 and short chain glycols whose molecular weight ranges from about 60 to 400 is preferable.

The long chain diol employed in the present invention is exemplified by polyester diol, polycarbonate diol, polyether diol, etc. Examples of the polyester diol include ones obtained by polycondensation of a polybasic acid such as adipic acid, succinic acid azelaic acid, sebacic acid, phthalic acid, isophthalic acid, terephthalic acid, etc. with a polyhydric alcohol such as 1,4-butanediol, 1,3-butanediol, ethylene glycol, diethylene glycol, propylene glycol, 1,2-propylene glycol, dipropylene glycol, 1,6-hexane glycol, neopentyl glycol, etc. or lactone-type compounds obtained by ring-opening-polymerization of a lactone such as $\epsilon$-caprolactone. Preferable examples of polycarbonate-type diol include those obtained by polycondensation of 1,6-hexanediol with diethyl carbonate or diphenyl carbonate. And, examples of polyether diol include polyethylene ether glycol, polypropylene ether glycol, polytetramethylene ether glycol or copolymerized polyether glycol thereof, etc.

Examples of the short-chain diol, whose molecular weight ranges from 60 to 400, employed in the present invention include ethylene glycol, diethylene glycol, propylene glycol, diproplylene glycol, 1,4-cyclohexane diol, 1,4-cyclohexane dimethanol, etc. Further, in addition to these diols, triol e.g. glycerine, trimethylol propane, 3-methyl-1,3,5-pentanetriol, etc. may be used together. The ratio of the short-chain diol varies with the molecular weight or kind of long-chain diol then employed, but it usually is in the range of from about 0.1 to 10 mol. relative to 1 mol. of the long-chain diol.

Polyisocyanate to be reacted with a polyhydroxy compound in the present invention may be any one selected from aromatic, aliphatic, alicyclic or aromatic aliphatic ones. Preferable examples of these polyisocyanates include organic diisocyanates such as tetramethylene diisocyanate, hexamethylene diisocyanate, $\omega,\omega'$-diisocyanate dimethyl cyclohexane, dicyclohexyl methane-diisocyanate, isophorone diisocyanate, $\omega,\omega'$-diisocyanate dimethylbenzene, methyl cyclohexylene diisocyanate, lysine diisocyanate, tolylene diisocyanate, diphenyl methane diisocyanate, etc., polymers of these organic diisocyanates, or polyisocyanates obtained by allowing an excess amount of such an organic disocyanate as above to react with a low-molecular active hydrogen compound e.g. ethylene glycol, propylene glycol, dipropylene glycol, butylene glycol, trimethylol propane, hexane triol, glycerine, sorbitol, pentaerythritol, castor oil, ethylenediamine, hexamethyelnediamine, ethanolamine, diethanolamine, triethanolamine, water, ammonia, urea, etc. or with a high-molecular active hydrogen compound e.g. polyether polyol, polyester polyol, acryl polyol, etc. of various kinds, or biuret compounds or allophanate compounds thereof.

The urethane resin having mercapto groups of the present invention can be obtained by allowing a compound prepared by substituting polyhydroxy compound having mercapto groups for a part or all of a polyhydroxy compound having no mercapto groups to react with polyisocyanate in the presence or absence of a solvent, and a preferable mixture ratio of NCO groups in the polyisocyanate/OH groups in the poyhydroxy compound is about 0.7/1 to 1.2/1. On the other hand, the mixture ratio of the polyhydroxy compound having mercapto groups in the urethane resin is such as the content of mercapto groups becomes about 0.01 to 1 milli-equivalent/g. When the content of mercapto groups is not more than 0.01 milli-equivalent, no satisfactory effect is recognized in the dispersability of strong magnetic powder, while when it exceeds 1 milli-equivalent/g, intra- or inter-molecular cohesion readily occurs to give undesirable influence upon the dispersability.

In the reaction described above, when necessary, conventional catalysts for urethane formation reaction, e.g. stannous octoate, dibutyltin dilaurate, tertiary amine, etc. can be employed.

The reaction described above can also be conducted in, for example, an aromatic solvent such as toluene, xylene, benzene, etc., a ketone-type solvent such as acetone, methyl ethyl ketone, methyl isobutyl ketone, cyclohexanone, etc., a hydrocarbon halogenide such as dichloromethane, 1,1,1-trichloriethane, etc., acetic acid ester such as ethyl acetate, propyl acetate, isopropyl acetate, butyl acetate, etc. and an inactive solvent such as N,N-dimethylformamide, N,N-dimethylacetamide, tetrahydrofuran, di-n-butyl ether, etc. The above-mentioned solvents are used in a volume of such an extent as the solid portion is about 20 to 80 weight %.

The urethane resin having mercapto groups obtained by such a method as above, may, upon necessity, be diluted with a solvent employed in the reaction mentioned above. The molecular weight of urethane resin ranges from about 10,000 to 200,000, preferably from about 20,000 to 100,000. By the action of mercapto groups in the molecule, affinity to magnetic powder increases to a large extent. Thus, ultra-micro-granulated magnetic powder or high-coercivitic magnetic powder can be well dispersed. Further, mercapto groups form a thiourethane bond by the reaction with isocyanate groups and thus no mercapto groups, which are hydrophilic groups, are left in the magnetic layer, the layer thus showing good moisture- and heat-resistance.

The polyisocyanate which is used as a curing agent for the above-mentioned urethane resin is a low-molecular polyisocyanate having two or more isocyanate groups, and preferable examples thereof include such an organic diisocyanate as employed in the production of the above-mentioned resin and polymers thereof or polyisocyanate obtained by allowing an excess amount of an organic diisocyanate to react with a low-molecular active hydrogen compound such as ethylene glycol, propylene glycol, dipropylene glycol, trimethylol propane, hexane triol, glycerine, sorbitol, pentaerythritol, castor oil, ethylenediamine, hexamethylenediamine, ethanolamine, diethanolamine, triethanolamine, water, ammonia, urea, etc. or a high-molecuar active hydrogen compound such as polyether polyol, polyester polyol, acryl polyol of various kinds, or a biuret compound or an allophante compound thereof. The molecular weight of these polyisocyanates ranges from about 150 to 7,000.

These polyisocyanates may be used as a solution in, for example, an aromatic solvent such as toluene, xylene, benzene, etc., a ketone-type solvent such as acetone, methyl ethyl ketone, methyl isobutyl ketone, cyclohexanone, etc., a halogenated hydrocarbon such as dichloromethane, 1,1,1-trichloroethane, etc., an acetic acid ester type solvent such as ethyl acetate, propyl acetate, isopropyl acetate, butyl acetate, etc., and an inert solvent such as N,N-dimethylformamide, N,N-dimethylacetamide, tetrahydrofuran, di-n-butyl ether, etc. In such cases as above, the solvent is used in a volume of such an extent as the solid portion is about 20 to 80 weight %.

The binder for the magnetic recording medium of the present invention is comprised of the above-described urethane resin and polyisocyanate. Their ratio is not particularly limitative, but is preferably about 3 to 60 weight parts of polyisocyanate relative to 100 weight parts of urethane resin.

To the above-mentioned urethane resin is, when necessary, added a conventional thermo-plastic polyurethane resin, polyester resin, nitrocellulose, vinyl chloride-vinyl acetate copolymer, vinyl chloride-vinyl acetate-vinyl alcohol copolymer, epoxy resin, phenoxy resin, etc. to prepare a binder.

In the thus-obtained binder for magnetic recording medium is dispersed strongly magnetic powder, and the dispersion is, upon necessity, dissolved in such a solvent as mentioned above. The dispersion which is then applied onto a nonmagnetic substrate to form a magnetic layer.

Examples of the ferromagnetic powder usable in the present invention include strongly magnetic granular iron oxide, strongly magnetic chromium dioxide, strongly magnetic powdery alloy, micro-granular hexagonal system barium ferrite, iron nitride, etc.

To the above-mentioned magnetic layer may further be added, in addition to the binder and strongly magnetic fine powder, a dispersing agent, a lubricant, an abrasive, an antistatic agent, a rust inhibitor, a curing catalyst, etc. as an additive.

As the dispersant, use is made of a $C_{12-18}$ fatty acid (R-COOH, R stands for alkyl or alkenyl having 11 to 17 carbon atoms) e.g. caprylic acid, capric acid, lauric acid, myristic acid palmitic acid, stearic acid, oleic acid, elaidic acid, linoleic acid, stearolic acid, etc., a metallic soap of the above-mentioned fatty acid with an alkali metal (Li, Na, K etc.) or an alkaline earth metal (Mg, Ca, Ba) a compound containing fluorine of the above-mentioned fatty acid ester, amide of the above-mentioned fatty acid, polyalkylene oxide alkyl phosphoric acid ester, trialkyl polyolefinoxy quaternary ammonium salt (carbon number of the alkyl ranges from 1 to 5, olefin is exemplified by ethylene, propylene etc.), etc. Besides these, a higher alcohol having 12 or more carbon atoms and, further, sulfuric acid ester can be used as well.

As the lubricant, use is made of silicone oil such as dialkyl polysiloxane (carbon number of the alkyl is 1 to 5), dialkoxy polysiloxane (carbon number of the alkoxy is 1 to 4), monoalkyl monoalkoxy polysiloxane (carbon number of the alkyl is 1 to 5; carbon number of the alkoxy is 1 to 4), phenyl polysiloxane, fluoroalkyl polysiloxane (carbon number of the alkyl is 1 to 5), etc., electrically conductive fine powder e.g. graphite, etc., inorganic fine powder e.g. molybdenum disulfide, tungsten disulfide, etc., fine powder of plastics e.g. polyethylene, polypropylene, polyethylene vinyl chloride copolymer, polytetrafluoroethylene, etc., α-olefin polymer, unsaturated aliphatic hydrocarbon in liquid state at normal temperatures (a compound in which n-olefin double bond is combined to the terminal carbon, whose carbon number is about 20), fatty acid esters composed of mono-basic fatty acid whose carbon number ranges from 12 to 20 and an alcohol whose carbon number ranges from 3 to 12, fluorocarbons, etc.

As the abrasive, use is made of a conventional one, for example, molten alumina, silicon carbide, chromium oxide($Cr_2O_3$), corundum, artificial corundum, diamond, artificial diamond, garnet, emery(principal components : corundum and magnetite), etc.

As the antistatic agent, use is made of, for example, electrically conductive fine powder such as carbon black, carbon black graft polymer, etc., natural surfactants such as saponin, etc., nonion sufactants of alkylene oxide-, glycerine- or glycidol-type, higher alkylamines, quaternary ammonium salts, heterocyclic compound such as pyridine, cationic surfactants such as phosphnium, anionic sufactants containing an acid group such as carboxylic. sulfonic, phosphoric, sulfonic acid ester or phosphoric acid ester group, amino acids, aminosulfonic acids, amphoteric surfactants such as sulfuric acid or phosphoric acid esters of amino alcohol, etc.

As the rust inhibitor, use is made of phosphoric acid, sulfamide, guanidine, pyridine, amine, urea, zinc chromate, calcium chromate, strontium chromate, etc., and use of especially a vapor phase inhibitor (inorganic or organic acid salt of amine, amide or imide) such as dicyclohexylamine nitrite, cyclohexylamine chromate, diisopropylamine nitrite, diethanolamine phosphate, cyclohexylammonium carbonate, hexamethylenediamine carbonate, propylenediamine stearate, guanidine carbonate, triethanolamine nitrite, morpholine stearate, etc. serves to enhance rust preventive effect.

As the curing catalyst, use is made of, for example, one which is employable in the production of the above-described urethane resin production.

As materials of the non-magnetic substrate, use is made of polyesters such as polyethylene terephthalate, polyethylene2,6-naphthalate, etc., polyolefines such as polyethylene, polypropylene, etc., cellulose derivatives such as cellulose triacetate, cellulose diacetate, cellulose acetate butyrate, cellulose acetate propionate, etc., polyvinyl resin such as polyvinyl chloride, polyvinylidene chloride, etc., and plastics such as polycarbonate, polyimide, polyamide, etc., and, besides, depending on necessity, non-magnetic metals such as aluminium copper, tin, zinc or a non-magnetic alloy containing them, ceramics such as glass, earthware, porcelain, etc., barytes or papers such as paper spread-coated or laminated with α-polyolefin having 2 to 10 carbon atoms such as polyethylene, polypropylene, ethylene-butene copolymer. The non-magnetic substrate can take any form, for example, film, tape, sheet, disc, card drum, etc. The volume of the material to applied, e.g., coated on the above substrate is that necessary to give a dry film-thickness ranging from about 0.1 μ to 5 μ.

Since the urethane resin of the present invention is possessed of hydrophilic polar groups (mercapto groups), it shows excellent dispersibility of magnetic power, when used as a binder for magnetic recording media. And, magnetic recording media prepared by using the binder are excellent in surface-smoothness and durability. Further, the mercapto groups contained in the magnetic layer react with isocyanate groups in the polyisocyanate to form thiourethane bonds to leave no hydrophilic polar groups i.e. mercapto groups, and thus is excellent in moisture- and heat-resistance as well.

The resin and the binding agent of the present invention are advantageously used in the production of magnetic recording media, for example, magnetic tape, magnetic disc, etc.

By way of the following examples, the present invention will be illustrated more specifically. Additionally stating, the content of mercapto groups was determined by subjecting mercapto groups to oxidation, then by subjecting the resultant to titration with an excess amount of iodine and sodium thiosulfate, then by calulating the amount of iodine required for oxidation.

EXAMPLE 1

A 5-l four neck flask equipped with a stirrer, thermometer and reflux condenser was filled with nitrogen gas, then the flask was charged with methyl ethyl ketone (3010 g), polyethylene adipate having a molecuar weight of 958 (1197.5 g), 1,4-butanediol (67.5 g) and stannous octoate (165 mg) as catalyst. The mixture was heated up to 65° C., to which was added tolylene diisocyanate (385.1 g), followed by stirring at 75° C. until the amine equivalent became about 10,000. Subsequently, 1,4-butanediol (16.88 g) and 3-mercapto-1,2-propanediol (6.75 g) were added to the mixture, followed by stirring at 75° C. until the viscosity became constant to give the urethane resin (A) of the present invention. The content of mercapto groups in the resin was 0.03 milliequivalent/g.

EXAMPLE 2

By following the same procedure as in Example 1 except that the respective amounts of 1,4-butanediol and 3-mercapto-1,2-propanediol to be added after the amine equivalent became constant were changed to 5.63 g and 20.25 g, the urethane resin (B) of the present invention was synthesized. The content of mercapto groups in the resin was 0.10 milliequivalent/g.

EXAMPLE 3

A 5-l four neck flask equipped with a stirrer, thermometoer and reflux condenser was filled with nitrogen gas, then the flask was charged with toluene (1018 g), methyl ethyl ketone (1018 g), polybutylene adipate having a molecular weight of 956 (1196 g), 1,4-butanediol (90 g), trimethylol propane (33.5 g) and stannous octoate (400 mg) as catalyst. The mixture was heated up to 65° C., to which was added isophoronediisocyanate (625 g), followed by stirring at 75° C. until the amine equivalent became about 10,000. Subsequently, 1,4-butanediol (35.25 g) and 3-mercapto-1,2-propanediol (54.00 g) were added to the mixture, followed by stirring at 75° C. until the viscosity became constant to give the urethane resin (C) of the present invention. The content of mercapto groups in the resin was 0.25 mill-equivalent/g.

EXAMPLE 4

A 5-l four neck flask equipped with a stirrer, thermometer and reflux condenser was filled with nitrogen gas, then the flask was charged with toluene (1125 g), methyl ethyl ketone (1125 g), polybutylene adipate having a molecular weight of 1002 (1364 g), 1,4-butanediol (61.3 g), 3-methyl-1,3,5-pentane-triol (91.4 g), 3-mercapto-1,2-propanediol (29.4 g) and stannous octoate (230 mg) as catalyst. The mixture was heated up to 65° C., to which was added isophorone-diisocyanate (667 g), followed by stirring at 75° C. until the viscosity become constant to give the urethane resin (D). The content of mercapto groups in the resin was 0.10 milli equivalent/g.

EXAMPLES 5 to 7

| Examples 5 to 7 | |
| --- | --- |
| γ-Fe₂SO₃ containing Co | 400 parts by weight |
| Urethane resin (A), (B), (C) and (D) obtained in Examples 1 to 4 | 50 parts by weight (calculated in terms of solid portion) |
| Vinyl chloride-vinyl acetate-vinyl alcohol copolymer (VAGH, Produced by UCC) | 50 parts by weight |
| Lecithin | 3 parts by weight |
| Silicone oil KF-96, Produced by The Shin-Etsu Chemical Co., Ltd.) | 6 parts by weight |
| Methyl ethyl ketone | 400 parts by weight |
| Toluene | 500 parts by weight |

The above-mentioned composition was kneaded and dispersed in a ball-mill for 48 hours, followed by subjecting to filtration with a filter. To the filtrate was added polyisocyanate (tolylene diisocyanate adduct of trimethylol propane: Takenate D-103 H : Produced by Takeda Chemical Industries, Ltd.)(20 weight parts), and the mixture was blended for 30 minutes. This magnetic coating was applied onto polyester film. The thickness of the coating was 5μ. The coated film was subjected to magnetic field orientation treatment, followed by drying. The resultant film was subjected to super-calender treatment, and was subjected to aging at 60° C. for 2 days. The result was shown in Table 1.

COMPARATIVE EXAMPLE 1

The same procedure as in Example 5 was followed except for the use of urethane resin (E) having sodium sulfonate (0.25 milliequivalent/g) in place of the urethane resin (A). The results are shown in Table 1.

TABLE 1

| | Urethane resin | Surface gloss[1] | Squareness ratio Br/Bm[2] | Moisture-, heat-resistance[3] |
| --- | --- | --- | --- | --- |
| Example 4 | (A) | 85 | 0.82 | tack free |
| Example 5 | (B) | 88 | 0.83 | tack free |
| Example 6 | (C) | 90 | 0.85 | tack free |
| Example 7 | (D) | 90 | 0.84 | tack free |
| Comparative Example | (E) | 83 | 0.80 | a little tacky |

[1]Surface gloss: By the use of the gloss-meter(manufactured by Suga Tester Co., Ltd.), the surface gloss was measured based on incident light at 60°.
[2]Squareness ratio:
[3]Resistance to moist heat: Each magnetic tape was wound on a glass tube, was allowed to stand at 70° C. and 95% RH for 24 hours and then at ordinary temperature for 24 hours, and unwound. Tackiness between the magnetic layer and the polyester film was observed.

As is clear from the above table, the magnetic coating prepared by using urethane resin of the present invention as a binder showed excellent dispersibility of magnetic powder and good moisture- and heat-resistance.

What is claimed is:

1. A urethane resin having mercapto groups in a ratio of about 0.01 to 1 milli-equivalent/g which is prepared by reacting a polyhydroxy component with a polyisocyanate, the polyhydroxy component being a mixture which comprises
    (1) a long chain diol having a molecular weight ranging from about 500 to 3000,
    (2) a short chain glycol having a molecular weight ranging from about 60 to 400, and
    (3) 3-mercapto-1,2-propane diol.
2. A urethane resin according to claim 1 whose molecular weight is from about 10,000 to 200,000.
3. A urethane resin according to claim 1 wherein the polyhydroxy component also contains a triol.
4. A urethane resin according to claim 1 wherein the ratio of NCO groups in the polyisocyanate/OH groups in the polyhydroxy component is about 0.71 to 1.2/1.
5. A binder for magnetic recording medium which comprises a urethane resin according to claim 1 and a low-molecular weight polyisocyanate, the amount of polyisocyanate resin being about 3 to 60 weight parts per 100 weight parts of urethane resin.

* * * * *